United States Patent [19]

Köppl et al.

[11] 4,252,780
[45] Feb. 24, 1981

[54] PROCESS FOR WORKING UP HYDROLYZABLE AND/OR WATER-SOLUBLE COMPOUNDS

[75] Inventors: Franz Köppl, Altötting; Thorgard Zainer, Marktl, both of Fed. Rep. of Germany

[73] Assignee: Wacker-Chemitronic Gesellschaft für Elektronik Grundstoffe mbH, Burghausen, Fed. Rep. of Germany

[21] Appl. No.: 32,984

[22] Filed: Apr. 25, 1979

[30] Foreign Application Priority Data

May 11, 1978 [DE] Fed. Rep. of Germany ....... 2820617

[51] Int. Cl.³ .............................................. C01B 33/12
[52] U.S. Cl. .................................... 423/335; 423/336; 423/659; 261/DIG. 54; 261/DIG. 75
[58] Field of Search ....................... 423/336, 659, 335; 261/DIG. 54, DIG. 75

[56] References Cited

U.S. PATENT DOCUMENTS

| | | | |
|---|---|---|---|
| 2,684,231 | 7/1954 | Pomykala | 423/242 A |
| 3,202,281 | 8/1965 | Weston | 423/561 R |
| 3,400,818 | 9/1968 | Tarjan | 261/DIG. 75 |
| 3,567,194 | 3/1971 | Shah et al. | 261/DIG. 54 |
| 3,775,314 | 11/1973 | Beitzel et al. | 261/DIG. 75 |
| 3,833,719 | 9/1974 | Kuerten et al. | 423/659 |
| 3,841,061 | 10/1974 | Pike | 261/DIG. 54 |

FOREIGN PATENT DOCUMENTS 50-39638 12/1975 Japan .................................. 423/561 R Primary Examiner—O. R. Vertiz
Assistant Examiner—Gary P. Straub
Attorney, Agent, or Firm—Allison C. Collard; Thomas M. Galgano

[57] ABSTRACT

A process for working up hydrolyzable and/or water-soluble compounds by placing them in water is provided wherein the compounds are fed into the funnel of a rotating cone of water running down into the tip of the cone, with the water being constantly renewed by a supply at the base of the cone. The process is particularly useful for working up mixtures containing silanes and/or chlorosilanes in silicon deposition plants.

6 Claims, 1 Drawing Figure

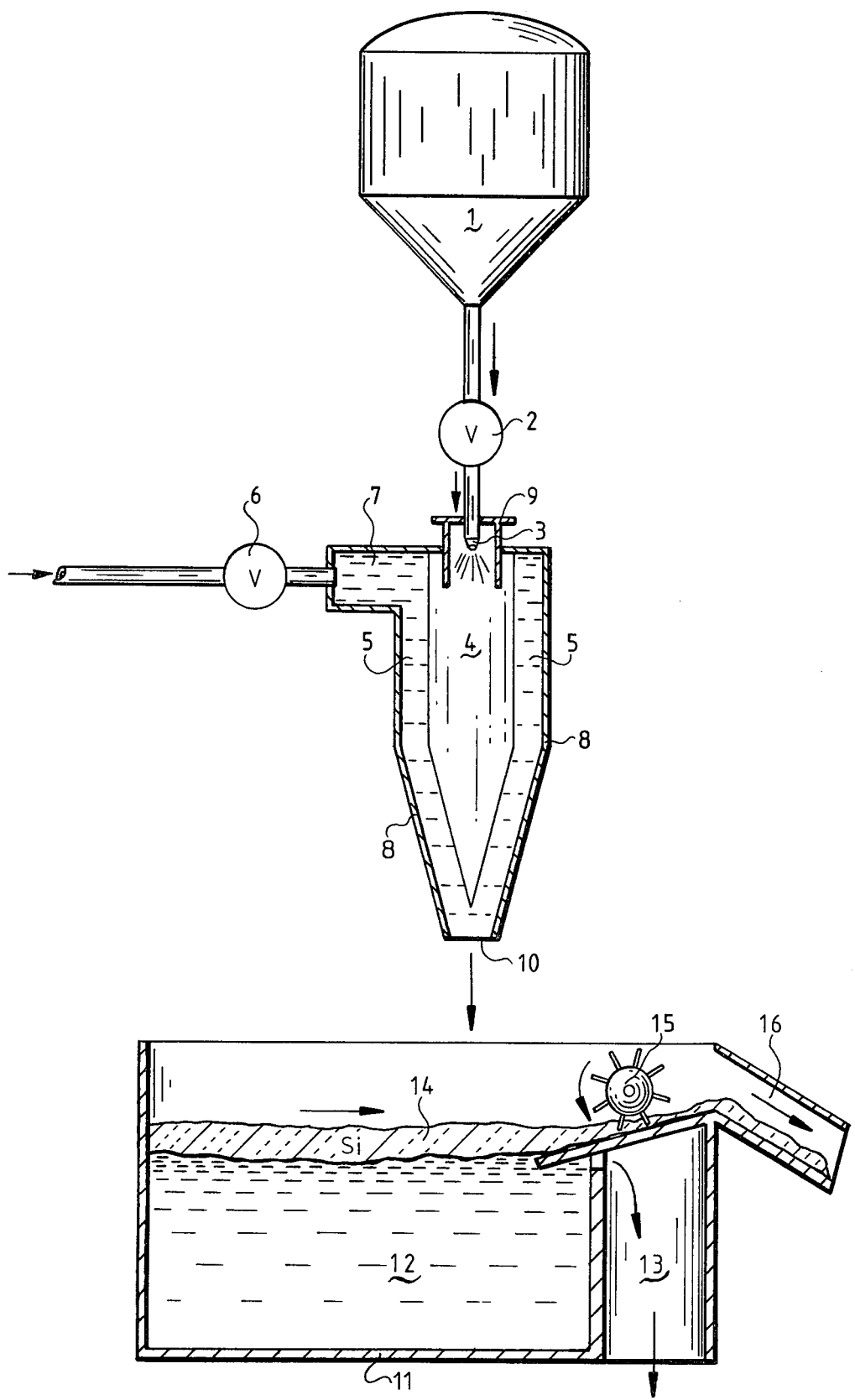

PROCESS FOR WORKING UP HYDROLYZABLE AND/OR WATER-SOLUBLE COMPOUNDS

The present invention relates to a process for working up hydrolyzable and/or water-soluble compounds.

The waste gases from silicon deposition plants generally contain hydrogen, chlorosilanes and hydrogen chloride. They have a strong corrosive effect in moist air and, because of a content of polymeric silicon-chlorine-hydrogen compounds, are spontaneously flammable. For these reasons, they cannot be discharged directly into the atmosphere. Also, when distilling halosilanes (for example, trichlorosilane) for silicon deposition, a number of corrosive, low-boiling and relatively high-boiling, fraction residues are formed which should expediently be destroyed quickly. In order to work up these waste gases and mixtures, purification processes are used: for example, scrubbing or wet purification; condensation by cooling; absorption by means of suitable washing agents; and also absorption using solids having a large surface area. Scrubbing is normally carried out with water, the hydrogen chloride being dissolved and the silanes being separated with the formation of hydrolysis products. Difficulties often arise in this process, however, as a result of the precipitation of gel-like silica, which tends to form lumps. These difficulties, which result especially in the blocking of the nozzles through which the waste gases are conveyed into the washers, mean that the working up plants frequently have to be switched off and cleaned.

The problem underlying the invention was therefore to find a superior process to the one described, which can be operated smoothly and continuously over long periods.

This problem is solved in accordance with the present invention by utilization of a process wherein the compounds to be worked up are fed into the funnel of a rotating cone of water running down into the tip of the cone, which rotating cone of water is being constantly renewed by a supply at the base of the cone.

The invention is described in more detail with reference to the drawing in which a suitable device for carrying out the process is shown diagrammatically.

Referring now in detail to the drawing, the hydrolyzable and/or water-soluble compounds, or mixtures containing such compounds, which are to be worked up, are compressed in a supply container 1, preferably under a slight excess pressure (advantageously, under a pressure of approximately 2 to 7 bar). They are then conveyed via a throttle valve 2 and via an actual supply nozzle 3 into a funnel 4 defined by a rotating cone of water 5. If the compounds to be destroyed are in liquid form, for example, in the case of relatively highly halogenated silanes or disilanes, it is advisable to atomize these compounds in the supply nozzle 3 by admixture thereof with a carrier gas inert towards these compounds (for example, nitrogen) before they enter the funnel of the rotating cone of water.

The funnel, i.e., the liquid-free space within the rotating cone of water, is produced by conveying water under a pressure of preferably 1.5 to 3 bar via a metering valve 6 and an inlet 7 tangentially into a tube 8 tapering conically downwardly. The upper portion of this conically-tapering tube may have a cylindrical configuration as shown in the drawing. This promotes a uniform unimpeded rotation of the water with a constant downward direction of discharge.

In some cases, it is advisable to protect the supply nozzle 3 from splashing water or moisture resulting from the tangential water supply by a protective tube 9 which surrounds nozzle 3 and projects, in the area adjacent to inlet 7, into the liquid-free space. The compounds to be worked up which are conveyed into the funnel 4 defined by the liquid-free space are entrained by the inner surface of the rotating liquid and, after being dissolved or hydrolyzed, are discharged through a discharge opening 10 together with any solid hydrolysis products which may be formed. Advantageous relative dimensions for the downwardly conically tapering tube are that the ratio of the diameter of the discharge opening to the diameter at the base of the cone or of the cylindrical portion is approximately in the range between 1:3 to 1:8. The ratio of the total length of the tube to the diameter at the base of the conical portion or of the cylindrical portion is advantageously approximately in the range between 3:1 to 8:1. The length of the cylindrical portion of the tube advantageously corresponds to approximately 0 to 2 times, preferably 0.5 to 1.5 times, its diameter.

In the preferred application of the process for working up mixtures containing silanes and/or chlorosilanes, the water flowing out of the discharge opening 10 is conveyed, together with the dissolved and hydrolyzed compounds to be worked up, to the silica discharge in a container 11. Therein, it separates into an aqueous layer 12 containing hydrochloric acid which may be discharged through the outlet 13 and into a phase 14 of a silica suspension floating thereon which is discharged by means of a transport wheel 15 through the outlet 16.

The process is primarily suited for working up and destroying any type of hydrolyzable and/or water-soluble substance, in particular, those which form solids during reaction with water and which may lead to blockages in the supply and discharge pipes. According to the process of the invention, the inner surface of the rotating cone of water forms the reaction surface when hydrolyzing the compounds to be worked up. This reaction surface is positioned away from the components of the device so that the deposition of solid hydrolysis products onto components of the device is avoided. This is also aided in that, because of the conical feed of the tube, the rotational speed of the water increases greatly towards the tip and thus solid hydrolysis products which are being formed are entrained and discharged quantitatively at the tip. The process can therefore be applied advantageously when working up waste gases in epitaxy in the case of doping processes, or in the case of processes for the production of semiconductors from the gaseous phase. It can be used equally advantageously in the destruction of corrosive distillation residues in organic and inorganic chemistry. Because of the very rapidly and continuously self-regenerating reaction surface of the freely rotating inner surface of the cone of water, a device of this type can be made considerably smaller than conventional washers. Since, in addition, according to the process of the invention, the ratio of the surface of the water which can be used for the reaction of the water throughput is considerably more favorable than in conventional plants, the water consumption can be drastically reduced.

Example

The relatively high-boiling and relatively low-boiling distillation residues typically occurring during the distillation of trichlorosilane are placed in a device, as shown diagrammatically in the drawing, in which the total height of the tube tapering conically downwards is 750 mm. The cylindrical portion has a height of 300 mm and an internal diameter of 150 mm. The diameter of the discharge opening is 50 mm and the inner cross-section of the water inlet is 40 mm high by 20 mm wide. These distillation residues having been compressed beforehand under a pressure of 1.5 bar are blown, at a rate of 4.5 kg/h, through the inlet nozzle into the funnel of the rotating cone of water. The water is supplied tangentially under a pressure of 3 bar and at a rate of approximately 6 to 8 m$^3$/h.

The plant has been operating smoothly and continuously for over a year and on no occasion has it been necessary to switch it off.

Thus, while only one embodiment of the present invention has been shown and described, it will be obvious to those persons of ordinary skill in the art, that many changes and modifications may be made thereunto, without departing from the spirit and scope of the invention.

What is claimed is:

1. A process for hydrolyzing silanes, comprising the steps of:

establishing in a vessel a downwardly-tapered, downwardly-spiraling cone of water having an upper base and a lower tip so that said water runs downwardly from said upper base to said lower tip, said cone of water being hollow and having an inner surface which forms a reaction surface positioned away from the surface of said vessel which defines a liquid-free closed space;

feeding said silanes into said funnel so as to hydrolyze said silanes upon contact with said reaction surface, while preventing the deposition of solid hydrolysis products on the surface of said vessel;

constantly renewing said cone of water by injecting water tangentially thereto at the base of said cone of water so as to regenerate said reaction surface; and freely discharging the aqueous mixture resulting from said contact.

2. The process according to claim 1, wherein said water is fed thereto at the base of said cone of water under a presure of 1.5 to 3 bar.

3. The process according to claim 1 or 2, wherein the compounds to be worked up are fed into said funnel under a pressure of 2 to 7 bar.

4. The process according to claim 1 or 2, additionally including the step of atomizing liquid compounds to be worked up with a carrier gas that is inert towards these compounds, before said compounds are fed to said funnel defined by said rotating cone of water.

5. The process according to claim 1, wherein kind silanes are a mixture of silanes and chlorosilanes.

6. The process according to claim 1, wherein said silanes comprise chlorosilanes.

* * * * *